(12) United States Patent
Endrys

(10) Patent No.: US 8,429,419 B2
(45) Date of Patent: Apr. 23, 2013

(54) METHOD FOR SECURING AUTHORIZED DATA ENTRY AND THE DEVICE TO PERFORM THIS METHOD

(75) Inventor: Bretislav Endrys, Zlin (CZ)

(73) Assignee: Monet+, a.s., Zlin-Stipa (CZ)

( * ) Notice: Subject to any disclaimer, the term of this patent is extended or adjusted under 35 U.S.C. 154(b) by 382 days.

(21) Appl. No.: 12/741,975

(22) PCT Filed: Oct. 24, 2008

(86) PCT No.: PCT/CZ2008/000131
§ 371 (c)(1),
(2), (4) Date: May 7, 2010

(87) PCT Pub. No.: WO2009/059569
PCT Pub. Date: May 14, 2009

(65) Prior Publication Data
US 2010/0299533 A1    Nov. 25, 2010

(30) Foreign Application Priority Data
Nov. 8, 2007   (CZ) .............................. PV 2007-779

(51) Int. Cl.
*H04L 9/32*        (2006.01)
*G06F 21/04*       (2006.01)
*G06F 12/14*       (2006.01)

(52) U.S. Cl.
USPC ........... 713/189; 713/165; 713/166; 713/167; 713/172; 713/185

(58) Field of Classification Search ........................ None
See application file for complete search history.

(56) References Cited

U.S. PATENT DOCUMENTS

| | | | |
|---|---|---|---|
| 4,405,829 A | 9/1983 | Rivest et al. | |
| 2004/0268133 A1* | 12/2004 | Lee et al. | 713/186 |
| 2006/0101128 A1* | 5/2006 | Waterson | 709/212 |
| 2006/0265736 A1* | 11/2006 | Robertson et al. | 726/3 |

FOREIGN PATENT DOCUMENTS

| | | |
|---|---|---|
| DE | 102005008433 A1 | 8/2006 |
| EP | 0763791 A1 | 3/1997 |
| EP | 1632838 A2 | 3/2006 |
| GB | 2267986 A | 12/1993 |

* cited by examiner

*Primary Examiner* — David Garcia Cervetti
*Assistant Examiner* — Fatoumata Traore
(74) *Attorney, Agent, or Firm* — Hovey Williams LLP

(57) ABSTRACT

A method and device for authorized data entry and securing the authenticity of such data when entering cryptographic operations in a computer requiring authorized data entry, sends a specific command to an STM module which defines a template of input data intended to be cryptographically processed. The STM module is switched over to a secure typing mode, the STM module autonomously controls the typing of required data items of the data template by recording characters typed on the connected entry device, and the recorded characters are arranged by the STM module in its internal memory in requested data structures defined by the input data template, and such created data are sent by the STM module directly to a token where the requested cryptographic operation is called, the result of which is sent to the computer by the STM module, and subsequently the STM module switches back to the transparent mode.

8 Claims, 1 Drawing Sheet

METHOD FOR SECURING AUTHORIZED DATA ENTRY AND THE DEVICE TO PERFORM THIS METHOD

This is a National stage application filed pursuant to 35 U.S.C. §371 of International Application Ser. No. PCT/CZ2008/000131 filed 24 Oct. 2008 and claiming priority from and the benefit of Czech Republic Application Ser. No. PV 2007.779 filed 8 Nov. 2007, the entire disclosures of which are incorporated herein by reference.

TECHNICAL FIELD

The invention relates to a method of securing authorized data entry and securing the authenticity of such data when entering cryptographic operations which are performed by external cryptographic tokens connected to the PC and, in addition, it relates to a device to perform the method.

BACKGROUND ART

The current state of the art describes methods of performing security schemes based upon conventional computer architecture which utilize cryptographic methods. These methods are usually based upon the usage of HW secure tokens (smart cards, secure USB devices). This ensures high security of cryptographic key storage and the authorized use of cryptographic keys (PIN entry required to access token-based operations). Securing the authenticity of data entering token operations causes bigger problems. Applications utilizing external cryptographic tokens to secure data can show the client the correct data intended to be processed (such as a payment order to the client's bank), however, an unreliable computer environment cannot guarantee that the data will actually be sent to the token and processed therein in their identical form. Harmful software can modify the data and thus damage the client's interests (e.g. modify the recipient's account in the payment order or alter the amount).

DISCLOSURE OF INVENTION

The afore-said problem can be eliminated if the input data entering cryptographic operations (or at least their informatively significant section) are sent, using a special module, directly from the input device (of Human Interface Device type, i.e. typically a keyboard) to the token in a method preventing any modification of the data, enabling the control system (typically a computer) to display the data at the utmost.

Thus, the computer is advantageously used only as a device to initiate the operation, to show the typed data (the user conducts a direct visual check of the typed data), to receive cryptographic result from the token and to enable communication between the system components. The method implements the "what-is-typed-on-the-keyboard-that-will-be-cryptographically-processed" principle. The present solution uses the STM module (Secure Typing Module), through which both a data entry device, i.e. typically a keyboard, and an external token (e.g. a smart card reader with a smart card or another HW external token) are connected. The STM module communicates with the PC native protocol of each connected device. Both afore-said devices, i.e. the data entry device (keyboard) and the token, can be used as an independent standard peripheral by the PC program equipment, the incorporated STM module does not affect the process at all as the data only pass through it, which represents so called transparent mode of the STM module behaviour. As soon as the STM module captures a specific command sent by the computer's application which defines the template of the data intended to be cryptographically processed, the STM module switches over to the secure typing mode, i.e. secure data entry. In this mode, the STM module's program equipment (firmware in the STM module's unmodifiable memory) autonomously controls the entry of the data items defined by the received template in the connected input device, and, in conjuction with the computer, the data can be displayed on a standard monitor for checking purposes (the method to display the characters entered on the input device is not significant). When the data items, entering a cryptographic operation, have been arranged, the STM module sends them directly to the connected token, which means that the typed data are sent directly from the STM module, not from the computer. The result of the cryptographic operation returns the waiting application in the computer for further procession defined by the security scheme. Then, the STM module automatically switches back to the transparent mode.

The user advantageous modification of the present method is to signal the switchover to the secure typing mode by STM module's means (e.g. visual signalling by an indicator) and to deactivate signalling after the mode has switched back to the transparent mode. Thus, the user can check the STM module functioning in an easy and convenient way.

Advantageously, if the token supports PIN code user authentication, the STM module in the secure typing mode enforces PIN code entry and its verification by the token before data are cryptographically processed in the token, with the PIN code value not being transferred to the computer environment.

The security of the system is strengthened if the STM module allows neither sending the command to verify the PIN code directly from the computer's application to the supported token, nor calling a cryptographic operation which is commonly used by the STM module. This functionality enables the STM module to ensure that whenever the STM module is used by the system, it is impossible to receive results of cryptographic operations from the token on the application level (by using cryptographic schemes utilized in the secure typing mode) which would be performed without the user's knowledge if the application simulated the STM module behaviour.

Further strengthening of security when performing the present method can be achieved by cryptographically securing the integrity of the input data template. In this case it is necessary that the reliable entity, managing input data templates, provides cryptographic protection for them, and the keys used to secure them must be distributed on client tokens. After receiving the data template, the STM module cryptographically verifies its integrity with the token use. Positive verification of the integrity is signalled to the client by STM module's means, in the event of verification failure the STM module ends the secure typing mode.

An advantageous modification of the STM module solution can be its implementation as an independent HW device, using standard peripheral devices with the USB interface (a keyboard, smart card reader or another HW token), enabling the usage of existing computer peripherals. Further simplification can be achieved by utilising a keyboard with an integrated smart card reader.

The essence of the device to secure authorized data entry and to secure the authenticity of such data is that it consists of a computer, display device, data entry device and external cryptographic token. Both the data entry device and the external token are connected to the computer via the additional STM module which is standardly in the transparent mode and does not affect the operation when data are transferred between the computer and the connected peripherals, e.g. the data entry device and the token, and the specific command sent from the computer's application is a transferred data template defining requirements for the input data of the cryptographic operation, and the STM module is able to switch over to the secure typing mode, in which the STM module autonomously controls the data typing on the data entry device and their cryptographic procession in the token.

It is advantageous if the input device is a conventional keyboard or a keyboard with an integrated smart card reader.

Advantageously, the STM module is equipped with a signalling means to signal the initiation and the end of the secure typing mode and the success of cryptographic verification of the integrity of the input data template.

MODES FOR CARRYING OUT THE INVENTION

Figure 1:
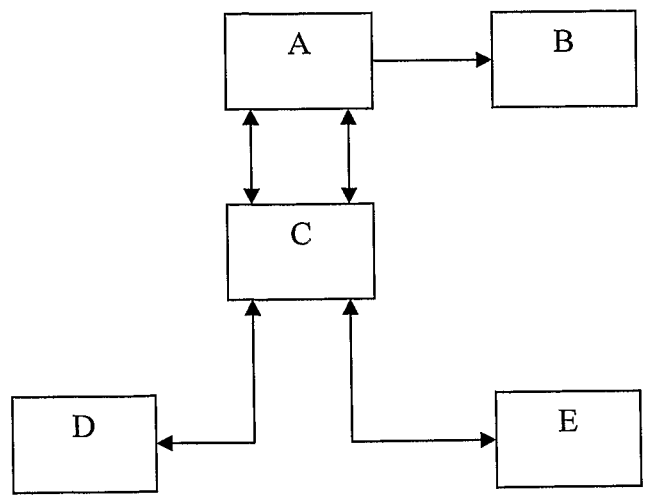
FIG. 1 of the drawings shows the general architecture of the solution with a standard computer in conjunction with the components to perform the method of the authorized data entry.

FIG. 1 shows logical architecture which, using conventional computer A, its display device B, such as monitor, data entry device D, e.g. a standard keyboard or a keyboard with an integrated smart card reader, external cryptographic token E and STM module C, establish a system for authorized data entry and for securing the authenticity of such data when entering cryptographic operations performed by the token E, whereas it is not important whether the STM module C is implemented as part of the keyboard or the token E or it is a separate device. The STM module C must be able to communicate with the computer A, using native protocols of each connected device (keyboard, token). The STM module C contains firmware in unmodifiable memory.

Figure 2:
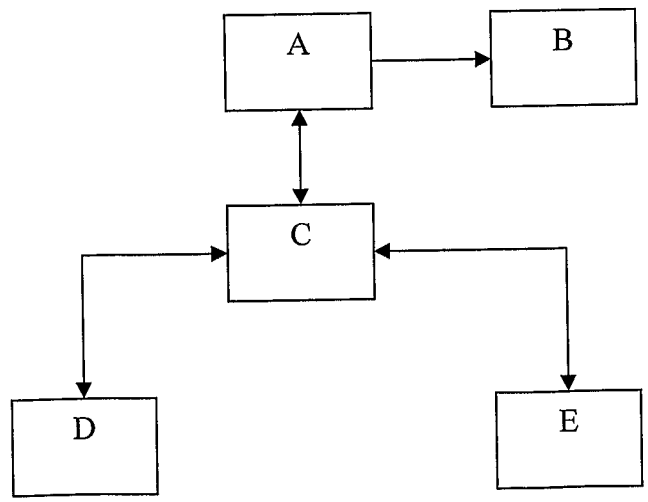
FIG. 2 of the drawings shows another advantageous modification of the computer connection with USB components to perform the present method.

FIG. 2 shows an advantageous modification of the STM module C connection using a separate HW module and standard peripherals with the USB interface, where the STM module C is connected to the computer A via the USB interface as well. Advantageously, a keyboard D and a reading device for the token E can be integrated in one physical device.

An example of the present invention embodiment is the implementation of the system for secure data entry, e.g. electronic payment orders and its electronic signature using conventional personal computer A equipped with USB keyboard D and USB smart card reader, or using USB keyboard D with an integrated smart card reader. Advantageously, the STM module C is implemented as a separate HW device which is connected to the USB interface of the computer A and which itself has USB interfaces to connect the keyboard D, or the USB token E. For standard operations performed on the computer A using the keyboard D and the token E, the STM module C acts in a transparent manner, i.e. these operations are not affected by it. Upon running this application, a specific command is sent to the STM module C which defines the template of the data intended as electronic signature input data. Capturing this command, the STM module C switches over to the secure typing mode, where it starts to use the connected keyboard D to enter the required data, the typed data are arranged in a structure defined by the template and the typed characters are displayed for checking purposes in the window of the running application in conjunction with the computer A's application. When the typing of data items has been finished, the STM module C can perform the authorization of the token E's user by entering the PIN code value and verifying it on the token E. Subsequently, the STM module C sends the data for the signature to the token E, receives the result of the operation and simultaneously with the return of the signature to the computer A's application it switches back to the transparent mode.

In order to strengthen the security of the entire solution, it is advantageous to equip the STM module C with functionality which prevents the computer A from calling security specific operations over the token E that are performed by the STM module autonomously as part of the control of the secure data typing, i.e. PIN code verification operations and the requirement to create electronic signature of the signature scheme used by STM module C. These commands are blocked by the STM module C, to the extent that they are not physically sent to the token E and the computer A receives a specific error code.

The data template identifies required data items entering cryptographic operations, it determines their format. However, the content of selected items is compulsory defined by the user. Nevertheless, the template can be data initiated and the computer A's application can visualize the template content in the application window. The user, or the computer application, can use such displayed data for additional checking purposes. Cryptographic operations use the data actually typed by the user.

If there is a reliable entity which defines the content of the template and at the same time evaluates cryptographic operations of the token E performed by the STM module C over these templates, data items of the template can be provided with an attribute specifying whether the initiated item is constant — it is defined by the reliable entity, or whether the user is compulsorily required to type it. The STM module C and the computer A's application conform to this attribute when entering the required items, the STM module C is responsible for arranging all data for cryptographic operation. Cryptographically processed data evaluation by the token E on the reliable entity's end includes cryptographic verification of the data and also verification whether the structure of the received data complies with the requirements of the sent template with comparing constant items of the template.

Another method to protect the integrity of template is cryptographic security. If the reliable entity, managing templates, secures them cryptographically and the token is the holder of the key which can be used to verify the integrity, the STM module C can evaluate the integrity of the template. It is advisable that the STM module C is equipped with an optical (e.g. light emitting diode), acoustic or another indicator which signals successful integrity of the template.

Industrial Applicability

The method for authorized typing of data entering cryptographic operations performed in an external HW token according to the present invention is an industrially applicable solution which can be used especially in electronic banking applications (with a small volume of typed data) where it is vital to implement a strong principle of non-repudiation and, furthermore, where it is advisable to secure the PIN code value against its capturing by the computer's harmful software equipment. Essential disclosures of the present solution includes significant strengthening of security, low costs to achieve this security and the fact that the solution does not change ergonomic methods used by external tokens's users.

The invention claimed is:

1. A method for securing authorized data entry and securing the authenticity of such data when entering cryptographic operations which are performed by external cryptographic tokens connected to a computer comprising the steps of:
- an application in the computer, requiring authorized data entry, sends a specific command to a secure typing module which defines a template of input data intended to be cryptographically processed;
- the specific command switches the secure typing module over to a secure typing mode, where the secure typing module autonomously control typing of required data items of the data template by recording characters typed on a connected entry device;
- the recorded characters are arranged in required data structures defined by the input data template in an internal memory of the secure typing module;
- the thereby created data are sent by the secure typing module directly to an external token where the requested cryptographic operation is called, the result of which is sent by the secure typing module to the computer;
- subsequently the secure typing module switches back to a transparent mode;
- wherein an integrity of the template of input data defined by the specific command is cryptographically protected;
- after reception of the specific command by the computer, the data template defined by the specific command is sent to the secure typing module and the secure typing module verifies the integrity of the data template using the cryptographic support of the external token;
- in the event of successful integrity verification the secure typing module signals this event; and
- in the event of unsuccessful integrity verification the secure typing module switches back to the transparent mode.

2. A method according to claim 1, wherein the switching of the secure typing module to the secure typing mode is signalled using signalling means of the secure typing module, and the signalling is deactivated when the secure typing mode has ended.

3. A method for securing authorized data entry and securing the authenticity of such data when entering cryptographic operations which are performed by external tokens connected to a computer, the method comprising the following steps:
- an application in the computer, requiring authorized data entry, sends a specific command to a secure typing module which defines a template of input data intended to be cryptographically processed;
- the specific command switches the secure typing module over to a secure typing mode, where the secure typing module autonomously control typing of required data items of the data template by recording characters typed on a connected entry device;
- the recorded characters are arranged in required data structures defined by the input data template in an internal memory of the secure typing module;
- the thereby created data are sent by the secure typing module directly to a token where the requested cryptographic operation is called, the result of which is sent by the secure typing module to the computer;
- subsequently the secure typing module switches back to a transparent mode;
- wherein an integrity of the template of input data defined by the specific command is cryptographically protected;
- after reception of the specific command by the computer, the data template defined by the specific command is sent to the secure typing module and the secure typing module verifies the integrity of the data template using the cryptographic support of the token;
- in the event of successful integrity verification the secure typing module signals this event; and
- in the event of unsuccessful integrity verification the secure typing module switches back to the transparent mode,
- wherein prior to the sending of the created data to the token to perform a cryptographic operation, the authentication of the token's owner is performed by enforcing PIN code entry and its verification of such authentication in the token, if the token supports such operation, without the secure typing module transferring a PIN code value to an unreliable environment of the computer.

4. A method according to claim 3, wherein the secure typing module prevents both verifying PIN code in the supported token and calling cryptographic operations specific to the use of the secure typing module module with a command sent directly from the application in the computer, and said command is captured by the STM module and is not transferred to be processed in the token whereas a message with an error code is returned to the application in the computer.

5. A device to secure authorized data entry and to secure the authenticity of such data comprising:
- a computer,
- a display device,
- a data entry device, and
- an external cryptographic token,
- wherein both the data entry device for data typing and the external cryptographic token are connected to the computer via a secure typing module which is standardly in a transparent mode when transferring data between the computer and one or more connected peripherals device, said peripherals device being selected from the group consisting of the data entry device and the external cryptographic token, without affecting the operation, and wherein a specific command sent from an application in the computer transfers a template of data defining requirements for the input data of cryptographic operations and the secure typing module is configured and arranged for switching over to a secure typing mode where the secure typing module autonomously controls data typing on the data entry device and cryptographic procession of the data in the external cryptographic token,
- wherein the integrity of the template of input data defined by the specific command is cryptographically protected,
- wherein after reception of the specific command by the computer, the data template defined by the specific command is sent to the secure typing module and the secure typing module verifies an integrity of the data template using the cryptographic support of the external cryptographic token,
- wherein in the event of successful integrity verification the secure typing module signals this event, and
- wherein in the event of unsuccessful integrity verification the secure typing module switches back to the transparent mode.

6. A device according to claim 5 wherein the data entry device is a keyboard.

7. A device according to claim 5, wherein the data entry device is a keyboard with an integrated smart card reader.

8. A device according to claim 5 wherein the secure typing module is equipped with signalling means to signal the initiation and end of the secure typing mode and the successful cryptographic verification of the integrity of the input data template.

* * * * *